(12) United States Patent
Schapira (10) Patent No.: US 11,616,730 B1
(45) Date of Patent: Mar. 28, 2023

(54) SYSTEM AND METHOD FOR ADAPTING TRANSMISSION RATE COMPUTATION BY A CONTENT TRANSMITTER

(71) Applicant: COMPIRA LABS LTD., Nes Ziona (IL)

(72) Inventor: Michael Schapira, Modi'in (IL)

(*) Notice: Subject to any disclaimer, the term of this patent is extended or adjusted under 35 U.S.C. 154(b) by 0 days.

(21) Appl. No.: 17/491,543

(22) Filed: Oct. 1, 2021

(51) Int. Cl.
  *H04L 47/25* (2022.01)
  *H04L 47/28* (2022.01)
  *H04L 67/61* (2022.01)
  *H04L 67/63* (2022.01)

(52) U.S. Cl.
  CPC .......... *H04L 47/25* (2013.01); *H04L 47/28* (2013.01); *H04L 67/63* (2022.05); *H04L 67/61* (2022.05)

(58) Field of Classification Search
  CPC ........... H04L 47/25; H04L 47/263–266; H04L 67/32–327
  See application file for complete search history.

(56) References Cited

U.S. PATENT DOCUMENTS

| | | | | |
|---|---|---|---|---|
| 9,521,178 | B1 * | 12/2016 | Gigliotti | H04L 47/25 |
| 10,498,655 | B1 * | 12/2019 | Nitzan | H04L 43/0882 |
| 10,771,393 | B1 * | 9/2020 | Korobov | H04L 67/133 |
| 2016/0296840 | A1 * | 10/2016 | Kaewell | A63F 13/30 |
| 2017/0142029 | A1 * | 5/2017 | Xia | H04L 65/80 |
| 2017/0195898 | A1 * | 7/2017 | Logan | H04W 24/02 |
| 2018/0262430 | A1 * | 9/2018 | Testicioglu | H04L 43/0888 |
| 2019/0068512 | A1 * | 2/2019 | Papaloukopoulos | H04L 43/18 |
| 2019/0149476 | A1 * | 5/2019 | Gervais | G06N 3/084 |
| | | | | 709/233 |
| 2019/0342770 | A1 * | 11/2019 | Ganapathi | H04L 69/16 |
| 2020/0028741 | A1 * | 1/2020 | Naylor | H04L 41/083 |
| 2020/0044979 | A1 * | 2/2020 | Kubba | H04W 28/085 |
| 2020/0162535 | A1 * | 5/2020 | Ma | H04L 65/403 |
| 2021/0067453 | A1 * | 3/2021 | Cui | H04L 1/18 |

* cited by examiner

*Primary Examiner* — Marcus Smith
(74) *Attorney, Agent, or Firm* — Alphapatent Associates, Ltd; Daniel J. Swirsky (57) ABSTRACT

A computerized system having multiple congestion control modules for determining a transmission rate for data traffic towards a destination device over a communication network, the transmission rate updated for specific time intervals, each congestion control module repeatedly collects performance-related data describing performance of content transmitted from the congestion control module to the destination device during specific time intervals, each congestion control module executes a transmission function for computing a next transmission rate for a next time interval, the transmission function receives as input performance-related data associated with prior transmission rates selected at prior time intervals, the transmission function including configurable parameters, the system also including one or more analyzers, each analyzer communicating with one or more of the multiple congestion control modules, where each analyzer periodically executes an adjusting function for reconfiguring the configurable parameters of the function for computing the next transmission rate.

16 Claims, 4 Drawing Sheets

SYSTEM AND METHOD FOR ADAPTING TRANSMISSION RATE COMPUTATION BY A CONTENT TRANSMITTER

FIELD

The present invention relates to computerized processes for adapting transmission rate computation by a content transmitter.

BACKGROUND

Massive volumes of content are transmitted over communication networks, for example for video streaming, video calls, online gaming, downloading software updates from servers and additional usages. The content, for example video, audio or simple data, is transmitted by traffic sources to destination devices, such as laptops, cellular phones, tablet computers, servers, and the like.

One challenge for content transmission is computing the best rate for transmitting the content to the destination device at each point in time. Sending content too slowly may result in, for example, low video resolution for video streaming as not sufficient data is delivered to support high resolutions, while sending too fast may lead data being lost or delayed within the network, also resulting in bad quality of experience for video clients.

Today's algorithms for controlling the rate at content transmitters are one-size-fits-all and do not customize the way in which transmission rates are computed by the transmitter to, for example, the service's needs, the destination device's type, and the prevailing network conditions with respect to the specific transmitter and destination device. Importantly, however, different services have very different requirements from the network (e.g., low "lag behind live" for video conferencing vs. very high throughput for video-on-demand), and different network environments (e.g., 5G, LTE, wired) exhibit very different characteristics in terms of the available bandwidth, the prevalence of non-congestion-related loss of data, the network latency, the level of competition with others, and the variability in network conditions. Consequently, one-size-fits-all rate control often falls short of keeping track of the optimal transmission rate, resulting in poor utilization of network bandwidth, and high loss and latency, and so bad quality of experience for users.

There is a need to transform content delivery from 'one size fits all' and oblivious to user experience to personalized and user-experience-centric.

SUMMARY

It is an object of the subject matter to disclose a computerized system having a memory and a processor for executing a set of instructions stored in the memory, the system comprising: multiple congestion control modules, each congestion control module of the multiple congestion control modules determines a transmission rate for data traffic towards a destination device over a communication network; wherein each congestion control module of the multiple congestion control modules updates the transmission rate for a specific time interval in which the content is transmitted to the destination device; wherein each congestion control module of the multiple congestion control modules repeatedly collects performance-related data describing performance of content transmitted from the congestion control module to the destination device during specific time intervals, with each time interval of the specific time intervals having a specific transmission rate; wherein each congestion control module of the multiple congestion control modules executes a transmission function for computing a next transmission rate for a next time interval, wherein the transmission function receives as input performance-related data associated with prior transmission rates selected at prior time intervals; wherein the transmission function includes configurable parameters; one or more analyzers, each analyzer of the one or more analyzers is communicating with one or more of the multiple congestion control modules; wherein each analyzer of the one or more analyzers periodically executes an adjusting function for reconfiguring the configurable parameters of the transmission function for computing the next transmission rate.

In some cases, the analyzer further obtains properties of the destination device and application type of the content transmitted to the destination device; wherein the analyzer further determines the values to assign to the configurable parameters of the transmission function based on the application type and the properties of the destination device. In some cases, the application type is selected from gaming, video calls, video streaming, communication with sensors and combination thereof.

In some cases, each congestion control module of the multiple congestion control modules selects a transmission function from multiple optional transmission functions; wherein the selection is based on an application type of the content sent to the destination device. In some cases, the analyzer computes the adjusting function for optimizing at least one metric. In some cases, the at least one metric is selected from a group comprising average throughput maximization, average data-packet loss rate minimization, and minimization of average end-to-end packet delays.

In some cases, the congestion control module further aggregates the performance-related data collected by the congestion control module and sends the aggregated performance-related data to the analyzer. In some cases, the analyzer further receives performance-related data comprising data received from the destination device.

In some cases, computing the adjusting function comprises evaluating a performance of a congestion control module of the multiple congestion control modules for several arrays of values of the configurable parameters. In some cases, the one or more analyzers further computes a duration of the next interval based on the performance-related data.

In some cases, the system further comprising multiple aggregators, each aggregator of the multiple aggregators is communicating with a subset of the multiple congestion control modules, each aggregator of the multiple aggregators collects and aggregates network performance statistics of its corresponding congestion control modules.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The method of the subject matter discloses a computerized system and method for improving the quality of data transmission from a transmitter having congestion control capabilities to a destination device, such as a television, laptop, cellular phone, or any other device receiving content over a communication network. The computerized system disclosed herein comprises a memory and a processor for executing a set of instructions stored in the memory. The system comprises multiple congestion control modules, with each congestion control module of the multiple congestion control modules transmitting content at transmission rates towards a destination device over a communication network. The communication network may be the internet, an intranet, a Local Access Network (LAN), wired cables used to carry signals, optical fiber network, a wireless network, or any other network desired by a person skilled in the art to transmit content from a transmitting device to a destination device.

In the context of the subject matter, each congestion control module of the multiple congestion control modules repeatedly updates the transmission rate for a specific time interval duration in which the content is transmitted to the destination device at the updated transmission rate. That is, the congestion control module does not implement a standard TCP protocol, in which the number of packets "in flight" (packets sent to the destination device for which no feedback on whether or not the transmission was successful has yet been received), as prescribed by the congestion window (cwnd) parameter, is computed. Rather, each congestion control module sends packets at a specific transmission rate, which prescribes the pace at which data packets are injected into the network (for example, a new packet is injected after a fixed time has elapsed from the transmission of the previous packet to maintain a rate of 1 Megabit per second) regardless of the number of packets in flight. Also, unlike standard TCP, the congestion control module can adapt the transmission rate by applying a transmission function that maps inputs associating previous selected or computed transmission rates and induced performance-related data to the next choice or computation of transmission rate, as described in detail below. This type of transmission protocol encompasses variants of "performance based congestion control (PCC)" such as PCC Allegro, PCC Vivace, PCC Proteus, PCC MORC, and PCC Aurora, and also variants of "Bottleneck Bandwidth and Round-trip propagation time (BBR)", including BBRv1 and BBRv2.

In accordance with the methods of the subject matter, each congestion control module of the multiple congestion control modules repeatedly collects performance-related data describing performance for content transmitted from the congestion control module to the destination device during specific time intervals. The transmission rate for a specific congestion control module changes from one time interval to a subsequent time interval. Changing the transmission rate between subsequent time intervals may be done by executing a transmission function for computing a transmission rate for a next time interval. The transmission function can receive as input the performance-related data associated with performance for content transmitted during prior time intervals according to chosen transmission rates. The performance-related data may be the raw performance-related data or manipulated raw performance-related data, such as the rate at which packets are received at the destination device, the packet loss rate, average packet delay, and other performance-related statistics extracted from the raw performance-related data. The transmission function includes configurable parameters.

The system also comprises one or more analyzers, each analyzer of the one or more analyzers is communicating with one or more of the multiple congestion control modules; wherein each analyzer of the one or more analyzers periodically reconfigures the configurable parameters of the transmission function executed by the congestion control modules. Different transmission functions may be utilized to compute transmission rates for different types of content sent from a specific transmitter to a specific destination device, for example according to different data types.

The term "performance-related data" refers to information representing transmission of content from a congestion control module to a destination device over a communication channel. The information may include identifiers or statistics of multiple data or data packets, such as the fraction of data received at the destination device, the rate at which data arrives at the destination device, average or minimum experienced packet delay (latency), packet loss rate, and values representing combinations of the above.

The term "function" refers to an arithmetic or logic operation executed by a computer processor. The function has configurable parameters, for example of the form "5 times X+D times R", where X, D, and R, are configurable.

The term "transmission function" refers to a function executed by a congestion control module for computing a transmission rate for transmitting content during a future time interval. The transmission function comprises configurable parameters. The values of the configurable parameters are provided by an analyzer coupled to a congestion control module. The transmission function may be evaluated before each time interval.

The term "adjusting function" refers to a function configured to compute values of the configurable parameters of the transmission function. The adjusting function is executed by an analyzer coupled to a congestion control module. The adjusting function may be applied at a frequency that is significantly lower than the frequency of applying the transmission function, for example applying the adjusting function once every several hours, while applying the transmission function once every few milliseconds.

Figure 1:
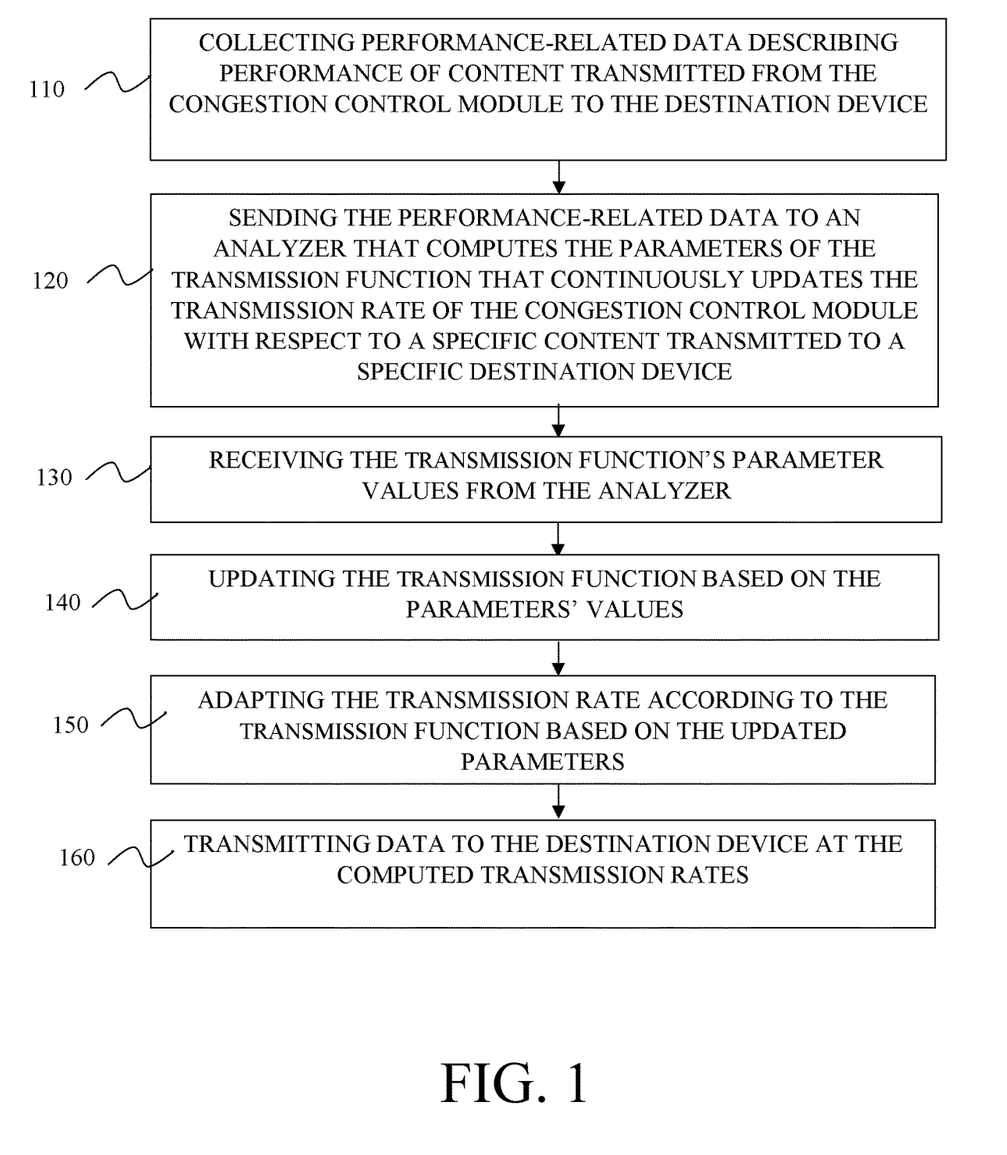
FIG. 1 shows a method for computing a transmission rate for content transmitted from a congestion control module to a destination device, according to exemplary embodiment of the present invention.

FIG. 1 shows a method for computing a transmission rate for content transmitted from a congestion control module to a destination device, according to exemplary embodiment of the present invention.

Figure 4:
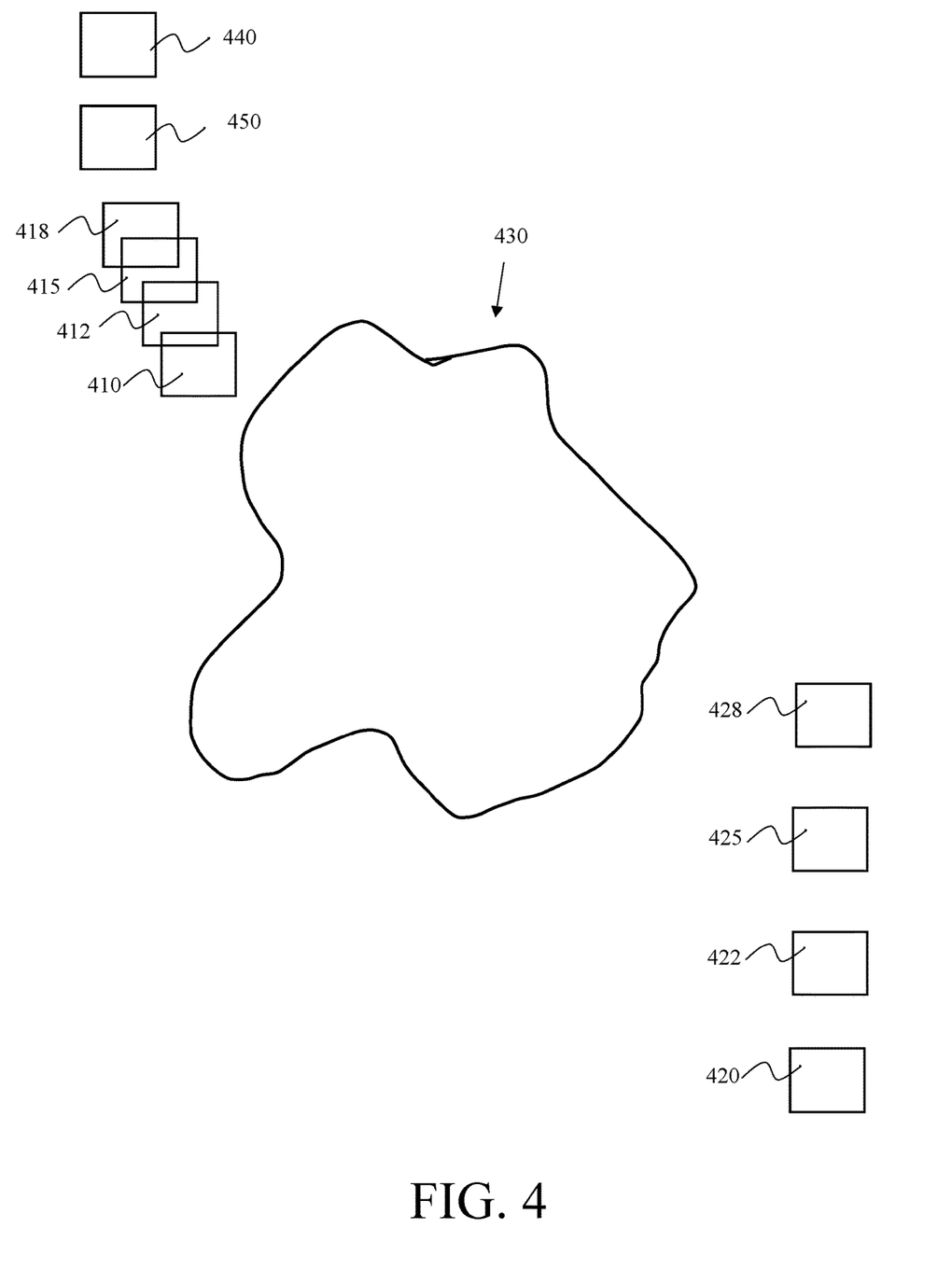
FIG. 4 shows a computerized environment for computing a transmission rate of content transmitted from a congestion control modules to a destination device, according to an exemplary embodiment of the present invention.

Step 110 discloses collecting performance-related data describing performance for content transmitted from the congestion control module to the destination device. The performance-related data may be collected via acknowledgement messages received from the destination devices, in response to successful receipt of content, for example of a data packet. The performance-related data may be collected via a component of the network (such as communication network 430), such as a switch, router, sensor located in the network, and the like. Performance-related data may be collected via a device or a software component operating in the destination device, for example a software agent, plug-in, and the like, where the software component communicates with the congestion control module that sent the content to the destination device in which the software component operates.

Step 120 discloses sending the performance-related data to an analyzer that computes the parameters of the function that updates the transmission rate of the congestion control module with respect to a destination device over time. Sending may be done over the internet or via another communication network. Sending may be done by updating a memory address in a memory accessible to the analyzer, such as an address located on an online server.

The analyzer computes values for the configurable parameters of the function executed by the congestion control module to compute the transmission rate for the next time interval based on performance-related data from previous time intervals, as elaborated below. The transmission of content by the congestion control module is divided into time intervals. During each specific time interval, the congestion control module transmits content to the destination device at a fairly constant transmission rate. For example, the congestion control module may transmit content, or dictate that a transmitter transmits content, at a rate of 8 megabytes per second at a time interval whose duration is 20 milliseconds, then at 10 megabytes per second for the same time duration, and then at 6 megabytes per second for a time interval having the same time duration. After collecting performance-related data for each of these choices of transmission rates, the congestion control module executes the transmission function, whose configurable parameters are set by the analyzer, to compute the transmission rate in the next time interval based on the previous transmission rates and performance-related data.

The number of configurable parameters in the transmission function may vary from one time interval to another. The number of configurable parameters in the transmission function may vary from one destination device to another. The number of configurable parameters in the transmission function may vary according to the application type of the content, such as video streaming, gaming, video calls, communication with sensors, and the like. The time duration may vary from one time interval to another, for example based on the performance-related data. For instance, if some of values indicating performance levels exceed certain thresholds, the time interval's duration may be reduced by 35 percent.

Step 130 discloses receiving the parameters' values from the analyzer. The analyzer may be a server or any other electronic device having processing capabilities and a memory storing rules used for executing the adjusting function. The adjusting function outputs the values assigned to the configurable parameters of the transmission function. The analyzer also comprises a transmitter for sending the parameters' values. The parameters' values may be sent to specific memory addresses in the memory of the congestion control module. In some cases, one analyzer may provide the same parameter values to multiple congestion control modules.

Step 140 discloses updating the transmission function based on the parameters' values. Updating the transmission function at a congestion control module comprises using the transmission function with the specific values to its configurable parameters as received from the analyzer. The updated transmission function may be used to adapt transmission rates with respect to all destination devices the congestion control module transmits content to, or for any subset of these destination devices. For example, a different transmission function may be used by the same congestion control module to adapt transmission rates for each individual destination device. After the transmission function with respect to one or more destination devices is updated, the updated transmission function is used to adapt transmission rates for all destination devices with which the transmission function is associated, and for specific subsequent time intervals, until the next update to the transmission function. In some cases, updating the transmission function comprises selecting one transmission function from multiple optional transmission functions stored at the specific congestion control module.

The transmission function may have multiple levels of complexity. For instance, a function employed by a congestion control module, which captures a simplified version of PCC Allegro's rate computation scheme, can be described as follows: After selecting a transmission rate of r (for instance, 9 Megabits per second) for a specific time interval, the congestion control module evaluates, over the course of the two following time intervals, the implications for performance of transmitting at a rate x % higher than r, for some parameter x, and of transmitting at a rate x % lower than r, for the same parameter x. Each of these two transmission rates, the higher rate and lower rate, is associated by the congestion control module with performance-related data such as throughput, that is, the rate at which data packets arrive at the destination device, and the packet loss rate experienced while sending at this rate. The performance-related data associated with each rate and time interval is then fed into a so-called utility function, which aggregates the performance-related data into a numerical utility value reflecting a performance score associated with the evaluated rate at the relevant time interval. For example, the utility value associated with a specific transmission rate at a specific time interval might be of the form $U=aT-bL$, where T and L are the throughput and the packet loss rate associated with the specific transmission rate. The parameters a and b are coefficients that reflect the importance for rate computation of each of the two metrics comprising the utility function: maximizing throughput and minimizing packet loss rate. For example, setting $b=0$ implies that rate optimization at the congestion control module disregards packet loss rate entirely, whereas setting b to be very high implies that rate computation is very sensitive to even a small increase in packet loss rate. After deriving the utility values for the higher and lower transmission rates, the congestion control module selects the transmission rate out of the two for which the utility value is higher. This process is then repeated for the new rate.

In the above example, by analyzing performance-related data associated with different choices of transmission rates by the congestion control module, the analyzer may periodically assign values to the parameters x, a, and b, so as to improve performance with respect to specific performance objectives.

In other instantiations of the transmission function of a congestion control module, the transmission function executed by the congestion control module may incorporate a more expressive utility function for associating a utility value with a transmission rate at a specific time interval than the utility function described above. For example, the utility function may also explicitly take into account packet delays when deriving a utility value (as in PCC Vivace and PCC Aurora). In addition, rate optimization may be performed by repeatedly estimating a gradient of the utility function at the current rate and executing gradient ascent to select the next rate (as in PCC Vivace) or by employing deep reinforcement learning on a training dataset to learn a rate-selection policy (as in PCC Aurora). As in PCC Proteus, different transmission functions may be utilized to support time-sensitive content (such as video-conferencing data traffic) and elastic data transmissions (such as software update downloads).

In other instantiations of the transmission function of a congestion control module, and as in BBRv1 and BBRv2, the congestion control module repeatedly probes higher and lower rates than the current transmission rate for the purpose of inferring the available bandwidth at the bottleneck communication link along the path the content traverses towards the destination device. The congestion control module then adapts the rate to match its estimation of the available bandwidth.

In each of the above described examples, the transmission function executed by the congestion control module captures the manner in which performance-related data associated with prior choices of transmission rates are mapped to the next transmission rate. By analyzing performance-related data associated with different choices of transmission rates by the congestion control module, the analyzer may periodically execute the adjusting function for assigning values to the configurable parameters of the transmission function. The values to the configurable parameters may include coefficients of the different metrics comprising a utility function (when a utility function is used to guide the selection of the transmission rate), the distance of probed higher and lower rates from the current rate (when such probing is performed), the step size for gradient ascent (when gradient ascent is employed to compute rates), etc.

Step 150 discloses adapting the transmission rate according to the function based on the updated parameters. The transmission rate is updated for a specific time interval, or for multiple time intervals. The new transmission rate, or the change to the current transmission rate, may be an output of the function. The updated transmission rate may be stored in a memory address accessible to a transmitter of the specific congestion control module. The memory address is used by the transmitter of the specific congestion control module as a target transmission rate.

Step 160 discloses transmitting data to the destination device at the computed transmission rates. The updated transmission rate is used during the entire time interval.

The process disclosed herein, of computing the updated transmission rate, may require a certain time duration, for example 0.5 milliseconds. Hence, for example, the process may initiate 1 millisecond before the end of a current time interval, to enable the transmitter of the specific congestion control module to prepare for transmitting the content in a desired transmission rate from the beginning of the subsequent time interval.

Figure 2:
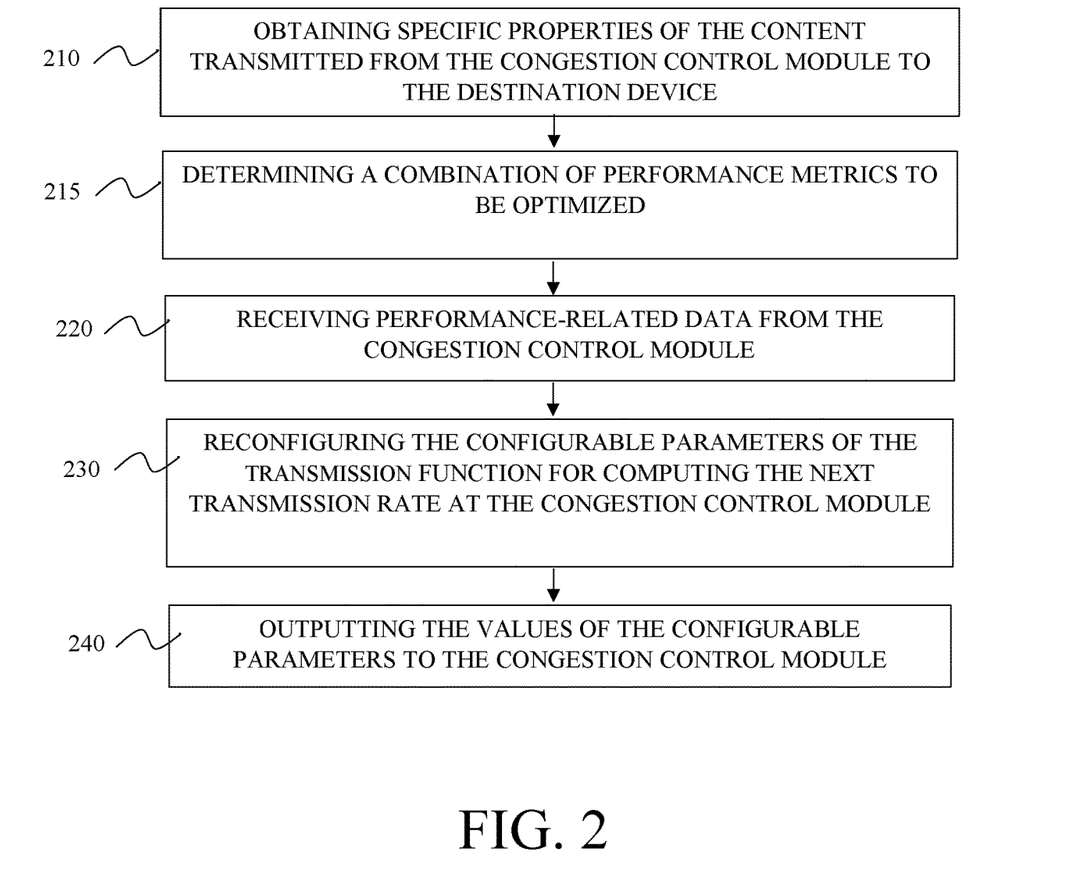
FIG. 2 shows a method of computing the configurable parameters to the function executed by the congestion control module, according to exemplary embodiment of the present invention.

FIG. 2 shows a method of computing the configurable parameters to the function executed by the congestion control module, according to exemplary embodiment of the present invention.

Step 210 discloses obtaining specific properties of the content transmitted from the congestion control module to the destination device. The specific properties may comprise the application type of the content transmitted to the destination device. The application type may be selected from a set of application types comprising video streaming, gaming, video calls, communication with sensors, and the like. The application type is important for determining the relevant metrics for quantifying quality of content delivery. For example, for video calls, keeping a low end-to-end delay experienced by data packets (for example, less than 200 milliseconds) is a primary objective, while for video-on-demand achieving high throughput to support high resolutions (for example, HD, 4K) may be much more important. The specific properties may also comprise the type of the destination device, for example for video streaming, because cellular phones might support lower video resolutions than personal computers.

Step 215 discloses determining a combination of performance metrics to be optimized by the analyzer when computing values for the configurable parameters of the transmission function executed by the congestion control module. These performance metrics may comprise network-level statistics such as the throughput, packet loss rate, the average packet delay, and other network-level metrics selected by a person skilled in the art. The performance metrics may also include metrics that quantify quality of experience for the specific application type of the content. For video streaming, for example, such metrics may include the average bitrate (resolution), the average or maximum time-to-start of the video, the average or maximum video rebuffering time, the lag-behind-live for real-time video delivery, and additional parameters selected by a person skilled in the art. A combination of performance metrics may include at least some of the performance metrics in the list above and, for example, weigh different metrics according to their importance by assigning a numerical coefficient to each metric, with higher coefficients corresponding to higher importance.

Step 220 discloses receiving performance-related data from the congestion control module. The performance-related data may be sent over the internet or via another communication network. The performance-related data may be sent by updating a memory address in a memory accessible to the analyzer, for example an address located on an online server.

Step 230 discloses reconfiguring the values of the configurable parameters of the transmission function for computing the next transmission rate used by the congestion control module. The parameters' values may be computed to reach the analyzer's optimization objective in the form of a combination of performance metrics. The parameters' values may be computed according to a process executed in the analyzer periodically or when receiving a new batch of performance-related data.

Step 240 discloses outputting the values of the configurable parameters to the congestion control module. The values of the configurable parameters may be sent over the internet or via another communication network. The values of the configurable parameters may be sent by updating a memory address in a memory accessible to the congestion control module, for example an address located in the memory of the congestion control module.

Figure 3:
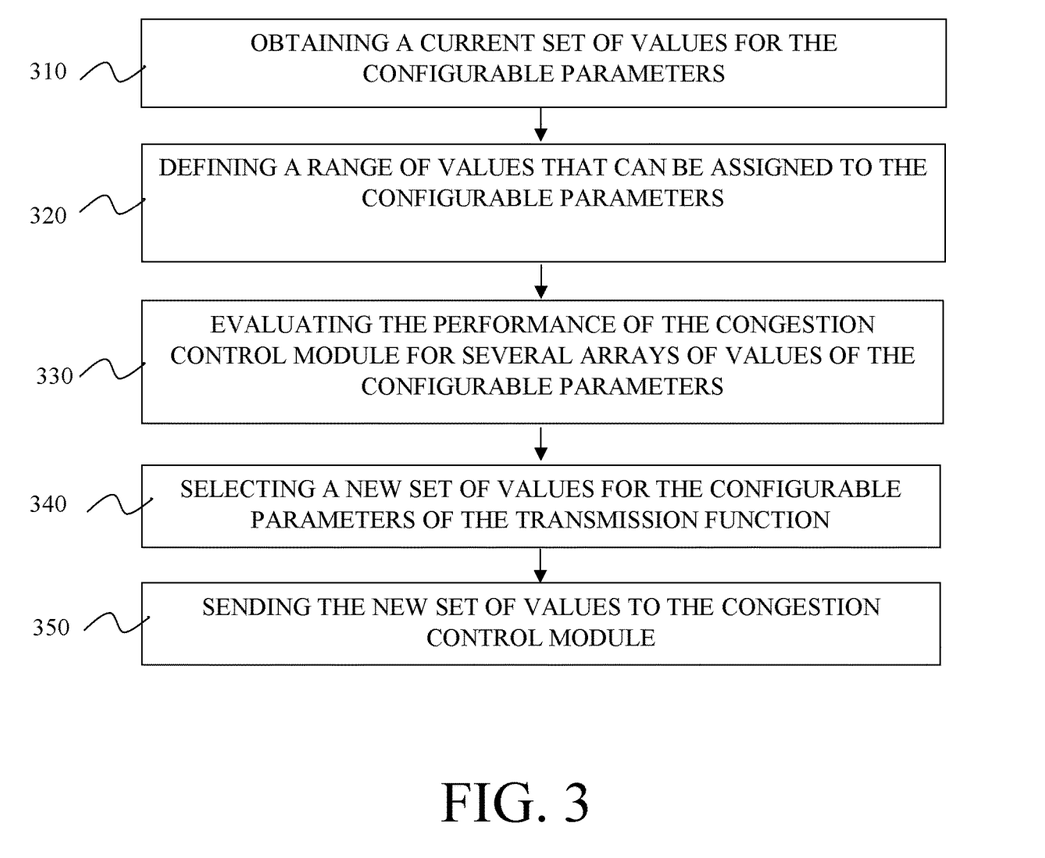
FIG. 3 shows a method of selecting the process for computing the configurable parameters to the function executed by the congestion control module, according to exemplary embodiment of the present invention.

FIG. 3 shows a method of selecting the process for computing the configurable parameters to the function executed by the congestion control module, according to exemplary embodiment of the present invention.

Step 310 discloses obtaining a current set of values for the configurable parameters to the congestion control module. The current set of values were computed in a prior instance, for example for time interval #45, while the analyzer is now required to compute the values of configurable parameters for time interval #46.

Step 320 discloses defining a range of values from which the values of the configurable parameters of the congestion control module are selected for evaluation. The analyzer may sample perturbations of the current values of the configurable parameters that lie within this range and, for each perturbation, quantify the performance induced by this change to the set of values of the configurable parameters. The perturbations could be limited to a certain range in the close vicinity of the current assignment of parameter values to the transmission function to limit the potentially adverse implications for performance of changing the current configuration of values of the configurable parameters. The limitation may be defined with respect to the entire vector of parameters, for example "not more than a total deviation of 0.1" for some notion of distance between vectors, or be specific to certain parameters, for example "not more than 7% deviation for parameter X".

Step 330 discloses evaluating the performance of the congestion control module's transmission function for several arrays of values of the configurable parameters of the transmission function. The performance may be evaluated with respect to the analyzer's optimization objective, which may be a weighted combination of different network-level and quality-of-experience performance metrics. After evaluating a sufficient number of vectors of values to identify a configuration that is superior (performance-wise) to the current assignment of values to the configurable parameters of the transmission function, this assignment may be used to update the transmission function, and the above process may be repeated with respect to the new configuration values, and so forth.

In some exemplary cases, the method comprises a process for optimizing the values of the configurable parameters. One option for the optimization process is evaluating the performance of the congestion control module as disclosed above and choosing the set of parameter values that yielded the best performance after a fixed number of perturbations of the current parameters have been sampled provided that these attain better performance than the performance of the current configuration of parameters of the transmission function, and remaining with the current configuration if current values of the configurable parameters were not outperformed by any of the sampled perturbations. Another instantiation of the optimization process is applying a genetic algorithm or a simulated annealing algorithm to identify high-performing perturbations of the current configuration of configurable parameters within the predetermined range of permitted configurations.

Another possible optimization process comprises the execution of a supervised learning process by the analyzer to facilitate what-if analysis. In this case, the analyzer samples different perturbations to the current set of values for the purpose of generating data for training a machine learning (ML) model that predicts the performance of an input configuration, as quantified by the analyzer's optimization objective. The ML model may be formulated as a supervised learning task where the inputs to the model are various values of the reconfigurable parameters, the outputs correspond to performance scores, and the loss function captures the distance between the output generated by the ML model and actual performance of the congestion control module.

After the ML model is trained, the analyzer can query the ML model to estimate how different assignments of values to the configurable parameters will impact the performance of the congestion control module and select a new set of values for which performance is estimated to be higher than the performance achieved by the current configuration. In some cases, the input to the ML model could be derived from configuration changes of multiple congestion control modules with respect to multiple destination devices, for example to allow for generalization from one context to another.

Another option for optimizing the selection of values for the reconfigurable parameters is applying reinforcement learning (RL) by the analyzer. In this case, the analyzer samples different perturbations to the current set of values in search of a superior set of values, only now this is done for the purpose of generating data for training an RL agent that maps past observations regarding the performance of the congestion control module resulting from different choices of values for the configurable parameters to the next choice of values. The input to the RL agent could, for instance, include a bounded history of multiple previous configurations evaluated and performance metrics associated with these multiple configurations. The output may be a limited change to the current set of values. The reward of the RL agent following an action could be quantified in terms of the analyzer's optimization objective. To train the RL agent, the analyzer may employ, for instance, a policy-gradients-based RL algorithm. The RL agent may be trained to select configurations for multiple congestion control modules in parallel, for the purpose of generating larger volumes of samples and of generalizing across contexts.

In some exemplary embodiments, the method may comprise optimizing the adjusting function executed by the analyzer according to one or more objectives. Such an objective may be a linear or non-linear combination of metrics such as the average/max/median/etc. of a network-level performance metric such as experienced network latency, packet loss rate, throughput, and the like. Such a linear or non-linear combination may comprise assigning a weight to each performance metric. The combination of such metrics could express, for example, the goal of maximizing achieved throughput while minimizing packet delays and losses. In this scenario, the analyzer can use the performance-related data gathered by the congestion control modules themselves to evaluate the performance induced by a specific configuration of the parameters.

In some other cases, the analyzer's adjusting function may also incorporate metrics that measure Quality of Experience (QoE) for a specific type of application. For example, in the context of video streaming, the adjusting function might be a linear or non-linear combination of metrics such as video rebuffering time, video bitrate/quality/resolution (HD, etc.), jitter (transition between different qualities while watching the same video stream), or a combination of these metrics. The combination of such metrics could express, for example, the goal of maximizing video quality while minimizing video rebuffering and jitter. The analyzer may then use performance-related data, for example data provided from a software agent installed at the destination device, to evaluate the performance induced by a specific configuration of the configurable parameters.

Step 340 discloses selecting a new set of values for the configurable parameters of the transmission function used by the congestion control module Step 350 discloses sending the new set of values of the configurable parameters to the congestion control module.

FIG. 4 shows a computerized environment for computing a transmission rate of content transmitted from a congestion control modules to a destination device, according to an exemplary embodiment of the present invention.

The computerized environment comprises congestion control modules 410, 412, 415, 418 configured to transmit content over a communication network 430. Each of the congestion control modules 410, 412, 415, 418 stores a transmission function used to determine the transmission rate at which data is sent from congestion control modules 410, 412, 415, 418, respectively, over the communication network 430 to destination devices 420, 422, 425, 428, respectively. In some cases, at least some of the multiple congestion control modules 410, 412, 415, 418 transmit content to multiple destination devices.

The congestion control modules 410, 412, 415, 418 may be servers, personal computers, laptops, or other electronic devices coupled with the communication network 430. With respect to each destination device to which content is transmitted by a congestion control module, congestion control modules 410, 412, 415, 418 transmit content at a stable transmission rate during a time interval. The time interval may be defined by data stored in the memory of the congestion control modules 410, 412, 415, 418, for example in the range of 1 millisecond to 5 seconds. Each of the congestion control modules 410, 412, 415, 418 executes the transmission function to compute a transmission rate for each time interval with respect to each destination device to which content is transmitted by the congestion control module.

The communication network 430 may be the internet, intra-net, local access network, or a combination thereof. The communication network 430 may comprise components such as software or hardware components, including switches, routers, cables, antennas and the like.

The computerized environment comprises a first analyzer 440 coupled to congestion control module 410 and a second analyzer 450 coupled to congestion control modules 412, 415, 418. In some cases, all the analyzers are coupled to a single congestion control module. In some other cases, all the analyzers are coupled to multiple congestion control modules. The analyzers 440, 450 are configured to execute an adjusting function that outputs adjustments to the parameters of the transmission function executed by the congestion control modules.

The congestion control modules 410, 412, 415, 418 and the analyzers 440, 450 comprise a processor. According to some embodiments, the processor comprises a processing functionality to perform the processes disclosed above. In some embodiments, the processor comprises one or more processing machines, for example processors, microprocessors, virtual machine processors and the like.

The congestion control modules 410, 412, 415, 418 and the analyzers 440, 450 comprise memory. The memory may be used to store data, such as data generated during the processes disclosed above, performance-related data, values for the configurable parameters of the function, rules for computing the values of the configurable parameters and additional data used to perform the processes as desired by a person skilled in the art.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A computerized system having a memory and a processor for executing a set of instructions stored in the memory, the system comprising:
multiple congestion control modules, each congestion control module of the multiple congestion control modules determines a transmission rate for data traffic towards a destination device over a communication network,
wherein each congestion control module of the multiple congestion control modules updates the transmission rate for a specific time interval in which the content is transmitted to the destination device,
wherein each congestion control module of the multiple congestion control modules repeatedly collects performance-related data regarding content transmitted from the congestion control module to the destination device during specific time intervals, said performance-related data is influenced by network congestion, with each time interval of the specific time intervals having a specific transmission rate,
wherein each congestion control module of the multiple congestion control modules executes a transmission function for computing a next transmission rate for a next time interval, wherein the transmission function has configurable parameters and receives as input values to the configurable parameters, and
one or more analyzers, each analyzer of the one or more analyzers is communicating with one or more of the multiple congestion control modules, wherein each analyzer of the one or more analyzers periodically executes an adjusting function for computing values to the configurable parameters of the transmission function for computing the next transmission rate,
wherein the performance-related data is only available at the transport layer (layer 4) and above,
wherein the transmission function of each of the multiple congestion control modules is updated by receiving new values for the configurable parameters of the transmission function from at least one of the one or more analyzers,
wherein computing the adjusting function involves evaluating a performance of the congestion control module's transmission function for several arrays of values for the configurable parameters with respect to an optimization objective of the analyzer,
wherein the performance for an array of values for the configurable parameters is measured using quality-of-experience performance metrics,
wherein the adjusting function optimizes a Quality of Experience (QoE) metric for a specific type of application, and
wherein the QoE metric is selected from video rebuffering time, video bitrate/quality/resolution, bitrate jitter, lag behind live, and a combination thereof.

2. The system of claim 1, wherein the analyzer further obtains properties of the destination device and application type of the content transmitted to the destination device, wherein the analyzer further determines the values to assign to the configurable parameters of the transmission function based on the application type and the properties of the destination device.

3. The system of claim 2, wherein the application type is selected from gaming, video calls, video streaming, communication with sensors and combination thereof.

4. The system of claim 1, wherein each congestion control module of the multiple congestion control modules selects a transmission function from multiple optional transmission functions, wherein the selection is based on an application type of the content sent to the destination device.

5. The system of claim 4, wherein the analyzer computes the adjusting function for optimizing at least one metric.

6. The system of claim 5, wherein the at least one metric is selected from a group comprising average throughput maximization, average data-packet loss rate minimization, and minimization of average end-to-end packet delays.

7. The system of claim 1, wherein the congestion control module further aggregates the performance-related data collected by the congestion control module and sends the aggregated performance-related data to the analyzer.

8. The system of claim 1, wherein the analyzer further receives performance-related data comprising data received from the destination device.

9. The system of claim 1, wherein computing the adjusting function comprises evaluating a performance of a congestion control module of the multiple congestion control modules for several arrays of values of the configurable parameters.

10. The system of claim 1, wherein the one or more analyzers further computes a duration of the next interval based on the performance-related data.

11. The system of claim 1, further comprising multiple aggregators, each aggregator of the multiple aggregators is communicating with a subset of the multiple congestion control modules, each aggregator of the multiple aggregators collects and aggregates network performance statistics of its corresponding congestion control modules.

12. The system of claim 1, wherein the performance-related data are collected via a component of the communication network.

13. The system of claim 12, wherein the component of the network is selected from a switch, a router and a sensor located in the communication network.

14. The system of claim 1, wherein the performance-related data is collected via a software component operating in the destination device.

15. The system of claim 1, wherein the performance-related data is network-level data.

16. The system of claim 1 where each congestion control module of the multiple congestion control modules determines a specific transmission rate for the content sent independently for each individual process running at the destination device.

* * * * *